June 23, 1970      D. K. CLASH      3,516,515

FOLDABLE STEP STRUCTURE FOR CAMPERS

Filed Oct. 15, 1968

INVENTOR:
DOUGLAS KEITH CLASH
BY
*Elliott & Pastoriza*
ATTORNEYS

United States Patent Office 3,516,515
Patented June 23, 1970

3,516,515
FOLDABLE STEP STRUCTURE FOR CAMPERS
Douglas Keith Clash, 22730 Draille Drive,
Torrance, Calif. 90505
Filed Oct. 15, 1968, Ser. No. 767,694
Int. Cl. E06c 9/08
U.S. Cl. 182—96                                4 Claims

ABSTRACT OF THE DISCLOSURE

A foldable step structure includes an elongated member arranged to be secured in a horizontal position above the ground adjacent to the lower sill of a camper door or portion of another area to which access is to be provided. First and second legs are hinged at their upper ends to opposite ends of the secured member with their lower ends engaging the ground when in an unfolded position. Steps extend between and have their ends pivoted to the first and second legs for pivoting movement about axes parallel to each other and normal to the plane of the legs. With this arrangement the legs and steps may be folded by laterally swinging movement of the legs about their upper hinges in their plane in the manner of a collapsing parallelogram so that the legs and step means can be nested in positions closely in horizontal alignment with the elongated member. A suitable bracket and cooperating coupling means is provided to hold the legs and steps in their folded positions.

---

This invention relates generally to foldable steps and more particularly to a novel foldable step structure particularly useful for trailers, campers, and the like.

BACKGROUND OF THE INVENTION

Foldable step structures are generally well known in the art and usually take the form of foldable or collapsible type step ladders. Generally such structures as have been provided constitute complete structures in and of themselves such as is the case with kitchen stools and portable kitchen type steps to facilitate access to relatively high places. In the case of campers and/or trailers, there is generally provided a door at a relatively high level above ground. While known collapsible type step ladders or similar structures could be used to facilitate entering or exiting from a camper or trailer door, it is necessary to carry the portable step ladder or similar structure in the camper or trailer itself. Since space is at a premium within such structures, the use of presently available steps or small ladders has been quite limited.

BRIEF DESCRIPTION OF THE PRESENT INVENTION

With the foregoing in mind, the present invention comprehends a novel foldable step structure particularly well suited for use with campers or trailer doors so designed as to avoid the problem of having to carry and store within the camper or trailer the particular structure involved.

More particularly, the invention takes the form of a foldable step structure adapted to be secured to the exterior of a camper or trailer adjacent to the lower sill of the door in a compact folded position. When it is desired to utilize the steps, a very simple manual unfolding operation is all that is necessary to provide proper steps.

In accord with the preferred embodiment of the invention, there is provided an elongated member together with means for securing the member in a horizontal position above the ground adjacent to the lower sill of the camper or trailer door. First and second leg means are hinged at their upper ends to opposite ends of the member with their lower ends engaging the ground when in unfolded positions. A plurality of steps extend between and are pivoted at their ends to the first and second legs for pivoting movement about axes parallel to each other and normal to the plane of the legs. With this arrangement, the legs and steps may be folded by lateral swinging movement of the legs in their plane in the manner of a collapsing parallelogram to nest the legs and steps in positions closely in horizontal alignment with the elongated member. The structure is held in its folded position by a suitable bracket affixed to the camper or trailer.

The foregoing structure is so designed that it may be secured to any type of camper or trailer or to any other elevated area to which access is desired without requiring appreciable modification of the structure involved. Thus steps are always available and yet may be readily folded to a compact position when not in use.

BRIEF DESCRIPTION OF THE DRAWINGS

A better understanding of the invention will be had by referring to a preferred embodiment as illustrated in the accompanying drawings, in which.

DETAILED DESCRIPTION OF THE PREFERRED EMBODIMENT

Figure 1:
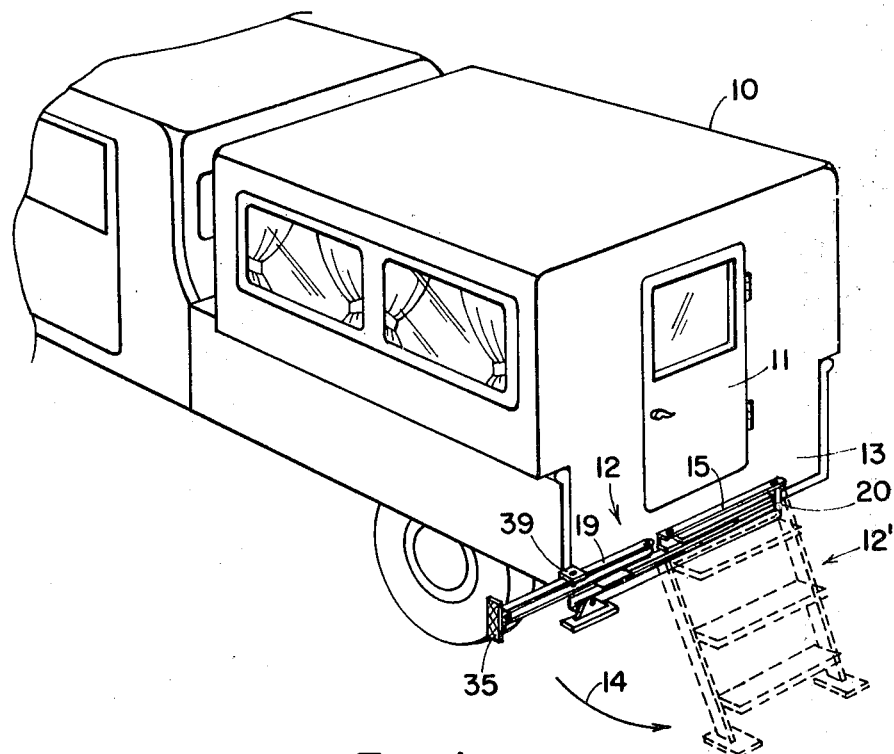
FIG. 1 is a fragmentary perspective view of the rear portion of a camper illustrating the foldable step structure of the present invention.

Referring first to FIG. 1 there is shown a typical camper 10 provided with a rear door 11. The foldable step structure of this invention is indicated generally by the numeral 12 and is shown in solid lines in folded position. The structure is preferably secured to the lower portion of the camper 13 adjacent to the lower sill of the door 11 as shown. As will become clearer as the description proceeds, the design of the foldable step structure is such that it may be readily swung laterally outwardly and downwardly in the direction of the arrow 14 to assume the dotted line position indicated at 12' wherein steps are provided for easy entrance and exiting from the door 11.

Figures 2, 3:
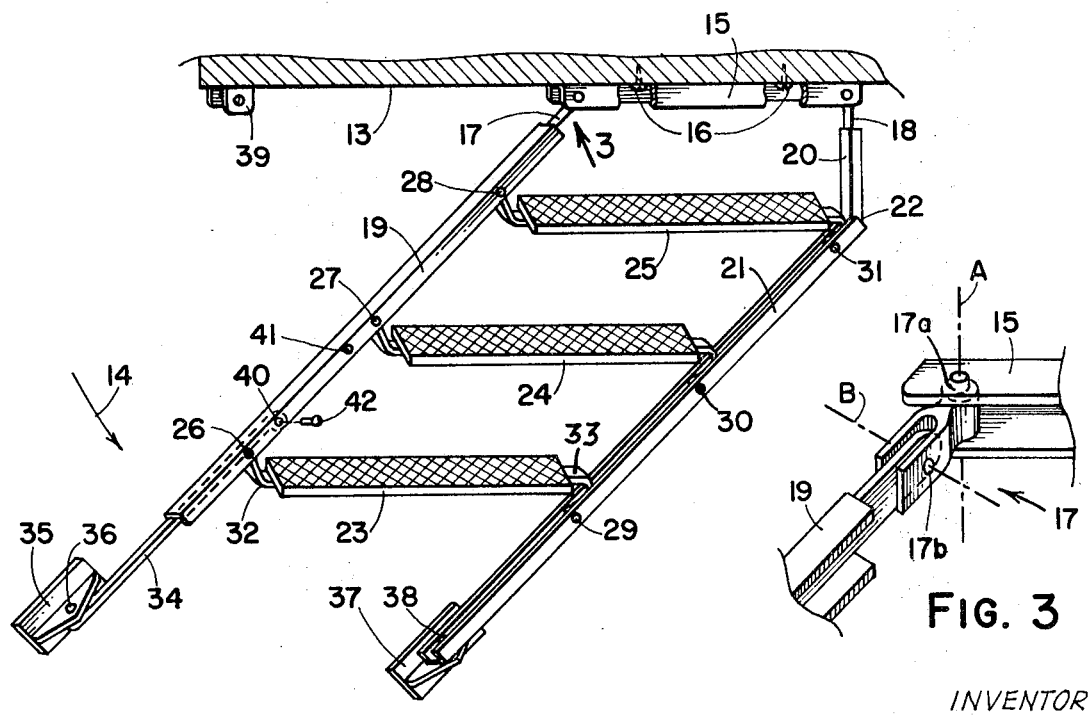
FIG. 2 is an enlarged fragmentary plan view of the foldable step structure of FIG. 1 in partially unfolded position.
FIG. 3 is a fragmentary perspective view of a portion of the structure of FIG. 2 looking in the direction of the arrow 3.

The manner in which the foregoing operation is realized will be evident by now referring to FIGS. 2 and 3. Referring first to FIG. 2, the foldable step structure is illustrated in partially unfolded condition. This structure includes a channel member 15 secured as by suitable fastening means in the form of screws or bolts 16 to the wall portion 13 of the camper as described in FIG. 1.

The opposite ends of the channel member 15 terminate in hinge means 17 and 18. Preferably, these hinge means are each compound hinges and will be described in detail subsequently.

A first leg channel means 19 has an upper end portion connected to the hinge means 17. Similarly, a second leg channel means includes an upper channel portion 20 connected to the hinge means 18. The second leg channel means also includes a channel 21 pivoted to the other end of the channel portion 20 as at 22. The purpose for this particular structure will become evident as the description proceeds.

Extending between the first and second leg channel means are step means in the form of individual steps 23, 24, and 25. The ends of these steps are pivoted to the first and second leg channel means as at the points 26, 27, and 28 for the first leg channel means 19 and at 29, 30, and 31 for the second leg channel means 21. The actual pivotal structure for each of the steps takes the form of curved bar segments such as indicated at 32 and 33 so shaped as to pivot the steps about parallel axes normal to the plane of the first and second legs 19 and 21; that is, perpendicular to the plane of the drawing of FIG. 2. With this arrangement, it will be evident that the legs may swing laterally in their plane; that is, the plane of the drawing of FIG. 2 to fold towards a compact position in the manner of a collapsing parallelogram.

Referring now to the lower portion of the first leg channel means 19, it will be noted that this portion includes a slide bar 34 adapted to extend from the end of the channel 19. The extending end of the slide bar 34 terminates in a first shoe in the form of a flat plate 35 having a flange normal thereto pivoted as at 36 to the slide bar 34. A second shoe means 37 in turn includes a normal flange pivoted as at 38 to the lower end of the second leg channel means 21. By so pivoting the first and second shoe means in the form of the plates 35 and 37, their flat under surfaces may engage the ground when the structure is unfolded in substantially full surface contact even though the inclination of the legs relative to the ground may vary.

Referring specifically to FIG. 3, the hinge means 17 is shown in greater detail. The hinge means 18 is identical and therefore a detailed description of one will suffice for both.

Thus, as shown in FIG. 3, the hinge means 17 includes a first pivot portion 17a pivoting the leg 19 for swinging movement about a vertical axis A. The same structure includes a bifurcated portion serving to pivot an extended end of the channel 19 as at 17b for swinging movement about an horizontal axis B.

By providing compound hinges at 17 and 18 as described in FIG. 3, the legs 19 and 21 can swing about an horizontal axis so that their inclination with respect to the ground when in unfolded position can adjust to the height of the channel member 15 above the ground in a manner to assure that the shoes 35 and 37 will properly engage the ground.

Referring once again to FIG. 2, it will be noted that there is provided a bracket 39 fixed to the wall portion 13 of the camper in substantial horizontal alignment with the channel member 15 and at a given spacing therefrom. The first leg channel means 19 in turn is provided with first and second openings 40 and 41. The second opening 41 is spaced from the hinge means 17 by a distance equal to the given spacing between the bracket 39 and the channel member 15 such that when the leg 19 is folded against the wall 13, the bracket 39 will encompass the channel 19. The bracket 39, as shown, is provided with a journal opening adapted to register with the second opening 41 in the channel 19 when the same is folded against the wall portion 13.

A pin 42 is shown in FIG. 2 passing through the first opening 40. This pin extends through the eye flange illustrated in dotted lines at the inner end of the slide bar 34 to hold the slide bar in its extended position in the channel 19. When the structure is folded, the pin 42 may be removed and the slide bar 34 telescoped into the channel 19. The pin is then inserted in the journal opening in the bracket 39 so that it passes through the second opening 41 in the channel 19 thereby effectively holding the structure in its folded position.

OPERATION

The operation of the foldable step structure of this invention will be evident from the foregoing description. Initially, the structure is as illustrated in solid lines in FIG. 1. In this position, the slide bar 34 shown in FIG. 2 is telescoped into the first leg channel 19 so that its eye flange structure registers with the second opening 41. The pin 42 in turn is inserted through the journal opening in the bracket 39 and the second opening 41 and eye flange opening for the slide bar thus holding the structure to the camper of FIG. 1 and also holding the slide bar in its innermost telescoped position. This arrangement prevents any undue overhanging of the structure to one side of the camper.

When the camper is parked and it is desired to utilize the steps, the pin 42 is removed from the bracket 39 and the slide bar 34 extended until its eye flange registers with the first opening 40. The pin 42 is then reinserted. The first and second legs 19 and 21 are now free to be laterally swung about the hinges 17 and 18 in the direction of the arrow 14 shown in FIG. 2. Simultaneously, the legs can swing downwardly in view of the compound structure of the hinges 17 and 18. The legs are brought into positions at right angles to the horizontal channel 15 and then the legs may be swung downwardly to an extent sufficient to cause the shoes 35 and 37 to solidly engage the ground all as illustrated in dotted lines in FIG. 1.

As mentioned heretofore, the pivot structure 32 for the step 23 when the legs are in their unfolded position will bear against the inside surface of the slide bar 34 to prevent the slide bar 34 from any inadvertent pivoting about the pin 42 so that a stable structure results.

While the invention has been described with respect to a camper or trailer, it will be evident to those skilled in the art that the channel member 15 and bracket 39 may be attached to any portion of an elevated area to which easy access is desired. In this respect, it is possible to provide a further support member to which the channel 15 and bracket 39 are permanently secured in proper spaced relationship. This further support member may then in turn be secured to a camper or trailer as desired.

From the foregoing description, it will thus be evident that the present invention has provided a greatly improved foldable step structure particularly well suited to campers and trailers. Minimum alteration is necessary in securing the same to either a camper or a trailer or any other structure. Further, when in folded position, the structure is out of the way and will not block the operation of the door itself in view of the nesting relationship provided all in substantial horizontal alignment. With respect to the folded position, the channel portion 20 described in FIG. 2 and its pivotal connection at 22 to the second leg channel 21 serves to enable the structure to accommodate the thicknesses of the three steps 23, 24, and 25 which will be in slightly overlapped relationship when the structure is folded.

While the invention has been described with respect to legs that swing to the left as viewed in FIG. 2, the same structure could be designed such that the legs swing to the right as viewed in FIG. 2, in which event, the bracket 39 would be disposed on the other side of the channel member 15. This latter structure might be desirable should a camper or trailer door be located near a left wall or near the left side of the camper or trailer.

What is claimed is:

1. A foldable step structure for use with camper doors comprising, in combination:
 (a) a channel member terminating at opposite ends in first and second hinge means;
 (b) securing means for securing said channel member to said camper in an horizontal position adjacent to the lower sill of a camper door;
 (c) first and second leg channel means respectively having upper end portions connected to said first and second hinge means and lower end portions engaging the ground when said structure is in its unfolded position;
 (d) step means extending between said first and second leg channel means and pivoted at their ends thereto for pivoting movement about axes parallel to each other and normal to the plane of said first and second leg channel means;
 (e) bracket means secured to said camper in horizontal alignment with said channel member and at a given horizontal distance therefrom;

(f) coupling means defined by said first leg channel means for securing said first leg channel means to said bracket means; whereby said first and second leg channel means and step means may be simultaneously folded in a manner of a collapsible parallelogram by laterally swinging said leg channel means about said hinge means in said plane, said coupling means operating to couple said first leg channel means to said bracket means after said leg channel means has been swung into its folded position so that said foldable step structure can be retained in a compact folded position above the ground; and (g) a channel portion formed by the upper end of said second leg channel means, said channel portion being connected at one end to said second hinge means and pivoted at its other end to the remaining portion of said second leg channel means for swinging movement in said plane, whereby said step means may be accommodated between said first and second leg channel means when in folded positions.

2. The subject matter of claim 1, in which the lower end portion of said first leg channel means includes a slide bar slidable from the end thereof, said slide bar terminating in its end extending from said leg channel means in a first shoe means for engaging the ground when said structure is in its unfolded position, the other end of said slide bar within said leg channel means terminating in an eye flange, said leg channel means having first and second openings longitudinally spaced therealong, said second opening being spaced said given distance from said first hinge means, said bracket including a journaling opening, said coupling means including a pin insertable through said journaling opening in said bracket, said second opening in said channel, and said eye flange in said slide bar when said slide bar is retracted into said leg channel means and said structure is in its folded position to thereby hold said structure in said folded position, said pin being removable from said bracket and insertable in said first opening and said eye flange when said slide bar is extended from the end of said leg channel means to secure said shoe means at a fixed distance from the end of said leg channel means, said second leg channel means terminating in a second shoe means for engaging the ground when said structure is unfolded in a manner such that the lower ends of said first and second leg channel means are supported on the ground at substantially the same horizontal level.

3. The subject matter of claim 2, in which said first and second shoe means comprise flat plates having flanges normal to their top surfaces, respectively pivoted to said slide bar and second leg channel means for pivoting movements about an horizontal axis when said structure is in its unfolded position so that the bottom surfaces of said flat plates engage the ground in full surface contact even though the inclination of said first and second leg channel means may vary.

4. The subject matter of claim 2, in which said step means comprise a plurality of individual steps equally successively spaced when said structure is unfolded, the pivot connection of the lowermost of said steps to said first leg channel means being spaced below said first opening so that said pivot connection holds said slide bar to said channel when in its extended position.

References Cited
UNITED STATES PATENTS

| | | | |
|---|---|---|---|
| 533,209 | 1/1895 | Coggeshall | 182—96 |
| 666,566 | 1/1901 | Sherman | 182—96 |
| 3,370,865 | 2/1968 | Baldwin | 182—159 |

REINALD P. MACHADO, Primary Examiner